US006763566B1

United States Patent
Hassler

(10) Patent No.: US 6,763,566 B1
(45) Date of Patent: Jul. 20, 2004

(54) METHOD AND DEVICE FOR DEMOUNTING/REMOUNTING HAMMERS, HAMMER AXLES AND/OR PROTECTIVE CAPS OF ROTORS OF HAMMER CRUSHERS

(75) Inventor: Martin Hassler, Düsseldorf (DE)

(73) Assignee: Metso Lindemann GmbH, Dusseldorf (DE)

( * ) Notice: Subject to any disclaimer, the term of this patent is extended or adjusted under 35 U.S.C. 154(b) by 52 days.

(21) Appl. No.: 10/018,278

(22) PCT Filed: May 31, 2000

(86) PCT No.: PCT/DE00/01798

§ 371 (c)(1),
(2), (4) Date: Apr. 2, 2002

(87) PCT Pub. No.: WO00/78459

PCT Pub. Date: Dec. 28, 2000

(30) Foreign Application Priority Data

Jun. 17, 1999 (DE) .......................... 199 27 765

(51) Int. Cl.⁷ ................................ B23P 19/00
(52) U.S. Cl. ................ 29/426.3; 29/426.5; 29/244; 29/252; 254/93 R; 254/105; 254/106; 254/133 R
(58) Field of Search ................ 29/426.3, 426.5, 29/244–268, 822–824, 235, 281.4, 402.08, 234, 281.6, 283; 254/93 R, 105, 106, 133 R, 14, 29 R, 228, 257, 259; 241/191–197

(56) References Cited

U.S. PATENT DOCUMENTS

| | | | |
|---|---|---|---|
| 3,727,848 A | * | 4/1973 | Francis |
| 3,785,617 A | * | 1/1974 | Friedrich |
| 3,834,668 A | * | 9/1974 | Casey |
| 4,017,957 A | * | 4/1977 | Dreyer |
| 4,136,833 A | * | 1/1979 | Knight |
| 4,288,904 A | * | 9/1981 | Lindberg |
| 4,384,395 A | * | 5/1983 | Gietman et al. |
| 4,650,129 A | * | 3/1987 | Newell et al. |
| 5,020,914 A | * | 6/1991 | Wurl et al. |
| 5,129,133 A | * | 7/1992 | Reesor |
| 5,205,671 A | * | 4/1993 | Handford |
| 5,694,672 A | * | 12/1997 | Perin |
| 5,701,649 A | * | 12/1997 | Reesor et al. |
| 6,081,983 A | * | 7/2000 | Hodgson et al. |

FOREIGN PATENT DOCUMENTS

| | | |
|---|---|---|
| DE | 2437793 | 2/1976 |
| DE | 199 27 551 | 6/2000 |
| DE | 199 27 765 | 12/2000 |
| DE | 199 27 341 | 2/2001 |

* cited by examiner

Primary Examiner—David P. Bryant
Assistant Examiner—Eric Compton
(74) Attorney, Agent, or Firm—Norris, McLaughlin & Marcus

(57) ABSTRACT

A method and apparatus involving releasing the rotor (1) and turning it to and fixing it at top dead center, attaching an extractor head to an exposed end of the hammer axle. A cross-piece (2.1) is applied and a releasable element of a slide (2.4) of a hammer axle puller is pulled, making a releasable connection between cross-piece and rotor attachment elements. The slide is moved to a position in which the puller head is connected to the slide in a shape-locking manner, securing the hammer position, returning the carriage whilst extracting the hammer axle (1.5) to release the hammer. The connection between the head and slide is released, moving the slide until the head and slide re-engage and returning the slide again to extract the hammer axle until the entire hammer and/or protective cap (1.4) and axle if appropriate are extracted. An Independent claim is also included for an arrangement for implementing the method.

15 Claims, 3 Drawing Sheets

Fig. 3
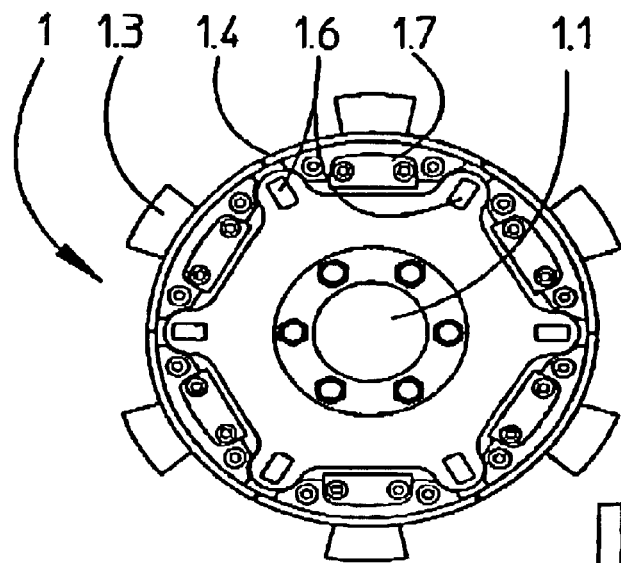
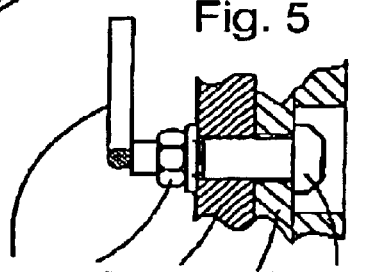
Fig. 5
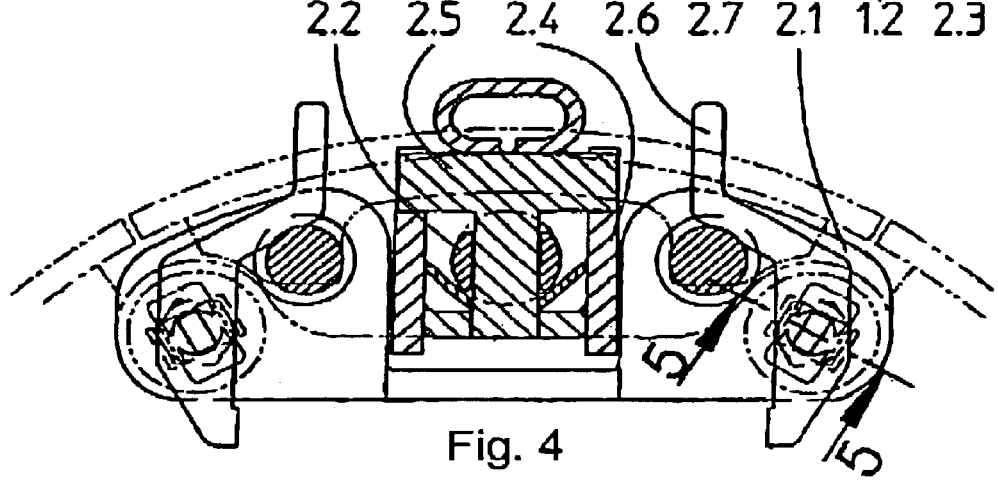
Fig. 4

METHOD AND DEVICE FOR DEMOUNTING/REMOUNTING HAMMERS, HAMMER AXLES AND/OR PROTECTIVE CAPS OF ROTORS OF HAMMER CRUSHERS

BACKGROUND OF THE INVENTION

1. Field of the Invention

The invention relates to a method and device for demounting/remounting hammers, hammer axles and/or protective caps of the rotors of hammer crushers, which are used in particular for comminuting of generally metallic scrap.

2. Description of the Related Art

Hammer crushers consist essentially of a housing with a rotor supported in the housing, with the rotor composed of a plurality of disks or spiders which are non-rotatably disposed on a shaft and hammers distributed between them. The hammers are rotatably supported on hammer axes that extend through the disks in a parallel-eccentric relationship to the shaft, wherein the hammer axes also hold protective caps which cover the rotor to protect the rotor against wear.

In the comminution process, the rotor and in particular the hammers, protective caps and the hammer axles holding the caps are subjected to the different wear conditions.

At least during the so-called maintenance intervals, wear may require that the spent hammers and/or protective caps are replaced by new ones. This is done by driving, pulling or pressing the hammer axles out of their seat in the disks or spiders.

For this purpose, devices with, for example, a hydraulic drive are used which represent an independent unit that can only be used during maintenance, but has otherwise no connection with the actual operation of the hammer crusher.

Depending on its operating mode, design and efficiency, such device which is typically referred to as a hammer axle pulling device, is important not only for changing hammers and protective caps of the hammer crusher, but also for an increased uptime of the hammer crusher.

Pulling the hammer axles can be difficult because the hammer axles are not only subjected to frictional wear, but also experience significant upsetting deformation. Accordingly, the hammer axles may have to be driven with very large forces through the bores of the disks or spiders, meaning that after its useful operating life, the respective hammer axle has both smaller and larger diameters as compared to the original manufacturing dimensions.

The hammer axle pulling devices used to date consist primarily of a moveable frame that can be moved manually, connecting rods secured to the frame and moveable thereto, which require significant space and are of complex design, so that the required maintenance has an unfavorable effect on the uptime of the hammer crusher system.

SUMMARY OF THE INVENTION

It is therefore the object of the invention to provide a method and a device, which simplifies demounting and remounting of hammers, hammer axles and/or protective caps in hammer crushers by eliminating the need for cross members and allowing a compact design of the device, by reducing manufacturing cost and by altering the sequence of steps required for demounting and remounting with the method to increase the uptime of the hammer crusher through reduced maintenance times.

The overall advantages of the invention and solution to the aforedescribed object of the invention are based on the fact that the method with the device can eliminate the use of pulling rods which reduces the required space for the pulling operation, so that the working platforms surrounding the hammer crusher, buildings and/or sound proofing walls can be set up closer to the hammer axle pulling device. Moreover, the drive can move the cross member close to the rotor, without requiring extensive manual labor for moving a carriage. Finally, the compact construction reduces manufacturing cost and investment expenses for building a hammer crusher, and the operating mode according to the invention increases the uptime of a hammer crusher plant.

BRIEF DESCRIPTION OF THE DRAWINGS

The foregoing and other features of the present invention will be more readily apparent from the following detailed description and drawings of illustrative embodiments of the invention wherein like reference numbers refer to similar elements throughout the several view and in which:

FIG. 3 shows a front view of the rotor of FIG. 2 without any features of the hammer axle pulling device;

FIG. 4 shows a detailed cross-sectional view along line 4—4 in FIG. 2; and

FIG. 5 shows a detailed cross-sectional view along line 5—5 in FIG. 4.

DETAILED DESCRIPTION OF THE PRESENTLY PREFERRED EMBODIMENTS

Figure 1:
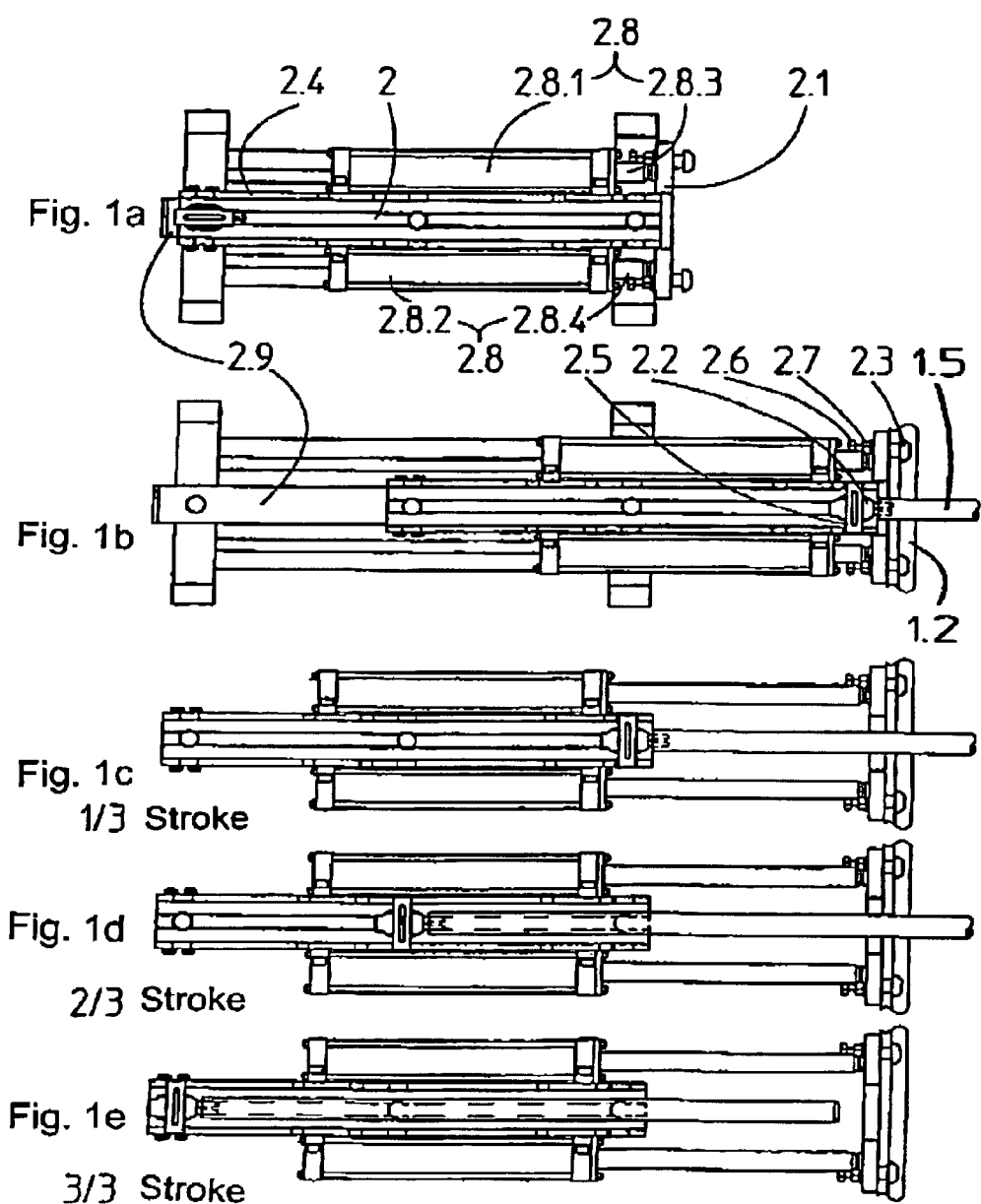
FIG. 1a shows a schematic diagram of a hammer axle pulling device in accordance with the present invention while in ready mode.
FIG. 1b shows a schematic diagram of the hammer axle pulling device in accordance with the present invention showing the connection between cross member and rotor.
FIG. 1c shows the hammer axle pulling device in accordance with the present invention wherein the hammer axle pulling device has pulled the hammer axle 1/3 stroke.
FIG. 1d shows the hammer axle pulling device in accordance with the present invention wherein the hammer axle pulling device has pulled the hammer axle 2/3 stroke.
FIG. 1e shows the hammer axle pulling device in accordance with the present invention wherein the hammer axle pulling device has pulled the hammer axle 3/3 stroke.

To provide a better understanding of the technological and constructive relationships, a rotor 1 supported in a housing (not shown) of a hammer crusher will be described first with reference to FIGS. 2 through 5. The rotor is made of several disks 1.2 or spiders that are non-rotatably disposed on a shaft 1.1, and of hammers 1.3 distributed between them, wherein the hammers 1.3 are rotatably supported on hammer axles 1.5 that are guided through the disks 1.2 parallel to and eccentrically with respect to the shaft 1.1. The hammer axles 1.5 also hold protective caps 1.4 which protect the rotor 1 and the disks 1.2 against wear. The hammer axles 1.5 are secured in the axle direction with releasable locking elements 1.7 which are affixed to the outer disks 1.2 Finally, openings, such as slots 1.6, which form corresponding attachment elements for a hammer axle pulling device 2 depicted in FIGS. 1a–e, are provided on the outer disk 1.2 to allow demounting and remounting of the hammers 1.3, hammer axles 1.5 and protective caps, as described above.

The hammer axle pulling device 2 according to the invention consists of a drive unit 2.8 which is connected to a lockable moveable slide 2.4 that can be moved on an anchored rail frame 2.9. The drive unit 2.8 has a cross member 2.1 with fixing elements 2.3, such as hammer head bolts, which engage with or engage behind the aforedescribed openings 1.6. Both the entire slide 2.4 and the cross member 2.1 can move relative to one another and to the rotor 1. A pulling head 2.2 is affixed, on one hand, on the hammer axle 1.5 after removal of the locking element 1.7 and, on the other hand, connected to the slide 2.4 for arrangement in several relative positions thereto.

The drive unit 2.8 consists of two hydraulic cylinders 2.8.1, 2.8.2 which are affixed to the slide 2.4 and include piston rods 2.8.3, 2.8.4 that are connected by the cross member 2.1. Alternatively, the drive unit 2.8 can also consists of an electric motor (not shown) with a spindle, whereby the spindle is connected to the cross member 2.1 by a threaded element.

The cross member 2.1 includes as fixing elements 2.3 the aforementioned hammer head screws, which engage in the corresponding slots or openings 1.6 of the end disks 1.2 or of a similar element of the rotor 1. The hammer head screws engage behind the end disks 1.2 by being rotated with locking levers 2.6 and are secured by nuts 2.7 (FIG. 5). In this position, the cross member 2.1 is in a fixed and releasable connection with the rotor 1.

The pulling head 2.2 is connected with the slide 2.4 by a releasable element 2.5, such as an insertable interlocking device, whereby the pulling head 2.2 can be locked on the slide 2.4 in several spacings/positions (FIG. 4). For this purpose, the slide 2.4 has several suitable positions.

When the piston rods 2.8.3, 2.8.4 (FIG. 1*a*) are retracted, the slide 2.4 is arranged at such a spacing in the axial direction of the rotor 1 and locked on the anchored rail frame 2.9 that the spacing corresponds to the length of the respective hammer axle 1.5 plus tolerances, divided by the required or desired number of a strokes (FIG. 1*c*) for pulling the hammer axle 1.5. The resulting position of the slide 2.4 is locked in position by the releaseable element 2.5 (FIG. 1*b*).

As a result, the hammer axle pulling device 2 is constructed so that the hammer axle 1.5, after having been completely pulled, rests in the slide 2.4 and can optionally be exchanged against a new hammer axle 1.5, with its position corresponding to the demounting and remounting position relative to the rotor 1.

It will be understood that the axle pulling device 2 implemented in this way can also be used for installing the hammer axles 1.5.

Figure 2:
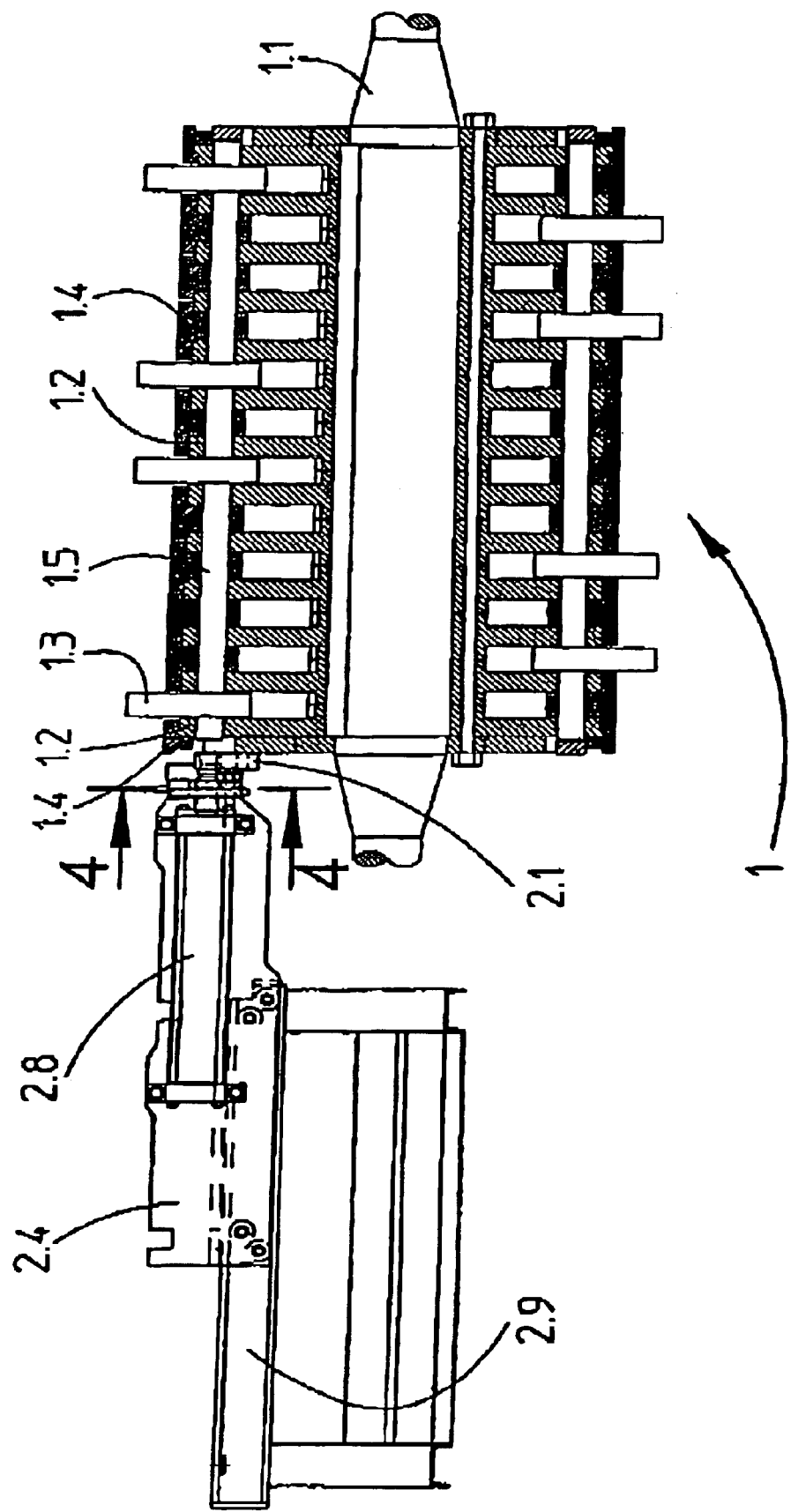
FIG. 2 shows a longitudinal cross-sectional view of the hammer axle pulling device with a hydraulic drive in releasable effective connection to the rotor of the hammer crusher.

The method of the invention for demounting and remounting of hammers 1.3, hammer axles 1.5 and/or protective caps 1.4 during a repair using the hammer axle pulling device 2 is implemented by carrying out the following process steps:

a) exposing the rotor 1, which remains mounted in at least one part of the housing, and rotating and securing the same in an upper dead center position of the respective hammer axle 1.5;

b) affixing a pulling head 2.2 on an exposed end of the hammer axle 1.5 (FIG. 1*b*);

c) mounting a cross member 2.1 with fixing elements 2.3 of a hammer axle pulling device 2 in a position in which the fixing elements 2.3 match corresponding fixing elements 1.6 on a front face of the rotor 1 (FIG. 2, FIG. 4, FIG. 5);

d) pulling a releasable element 2.5 of a slide 2.4 of the hammer axle pulling device 2 and keeping said releasable element 2.5 available;

e) producing a rigid and subsequently releasable connection between the fixing elements 2.3 of the cross member 2.1 and fixing elements 1.6 of the rotor (FIG. 5);

f) advancing the slide 2.4 of the hammer axle pulling device 2 to a position in which the pulling head 2.2 affixed on the hammer axle 1.5 is connected to the slide 2.4 with a positive fit by means of the releasable element 2.5 that is provided (FIG. 1*b*);

g) securing the position of the hammers 1.3 and optionally, of the protective caps 1.4;

h) retracting the slide 2.4 of the hammer axle pulling device 2 and simultaneously pulling the hammer axle 1.5 out to a first position in which at least one hammer 1.3 and/or optionally, a protective cap 1.4 can be removed freely (FIG. 1*c*, 1/3 stroke);

i) releasing the releasable connection between the pulling head 2.2 and the slide 2.4 using die releasable element 2.5;

j) once more, advancing the slide 2.4 to another position in which the pulling head 2.2 is again connected to the slide (2.4) with a positive fit;

k) once again, optionally repeatedly, retracting the slide 2.4 and pulling the hammer axle 1.5 out to a position in which all hammers 1.3 and/or protective caps 1.4 and optionally the hammer axle 1.5 are removed, thereby finishing the demounting step (FIG. 1*d*, 3/3 stroke; 2/3 stroke; FIG. 1*e*, 3/3 stroke; thereafter remounting by l) initially advancing the slide 2.4 connected to the new hammer axle 1.5, while subsequently reversing the order of the steps b) to k), as well as reversing the corresponding operational steps from the installation of the hammers 1.3 and/or protective caps 1.4 to the release of the fixing elements 2.3 of the cross member 2.1 of the slide 2.4 from the fixing elements 1.6 of the rotor 1 and removal of the cross member 2.1 by retracting the slide 2.4, as well as releasing attachment of the pulling head 2.2 with the hammer axle 1.5 and placing the rotor in the ready state for the comminution process.

The steps a) to l) are repeated depending on the remaining number of hammer axles 1.5 to be replaced in the rotor 1 and/or the number of the hammers 1.3 and/or protective caps 1.4 to be replaced.

It should be noted in the process flow that the locking element 1.7 that secures the hammer axle 1.5 is first released and then engaged after the remounting operation is complete.

The releasable connection in process step e) is established by rotating the locking lever 2.6 and the fixing elements 2.3 of the cross member 2.1, which are formed as hammer head screws and secured with nuts 2.7, and engaging the same behind the fixing elements 1.6 of the rotor, which are formed as openings or slots, whereby the cross member 2.1 is affixed to the rotor 1.

The process flow can also include that during a demounting phase of a hammer 1.3 and/or a protective cap 1.4 the respective element 1.3, 1.4 can be remounted in case of a partial wear by rotating them 180° in the opposite effective direction.

As stated above, the invention also provides for a device for carrying out the method as described above having a drive unit (2.8) connected to a lockable slide (2.4), with the drive unit (2.8) including a cross member (2.1) with fixing elements (2.3) for attachment to a rotor (1) of a hammer crusher (not shown). Both, the slide (2.4) and the cross member (2.1) and the drive unit (2.8) can move relative to the rotor (1) and relative to one another. A pulling head (2.2) is affixed on the hammer axle (1.5) and connected to the slide (2.4) so as to be capable of assuming several relative positions thereto. The drive unit (2.8) is made of two hydraulic cylinders (2.8.1, 2.8.2) which are affixed on the slide (2.4) and whose piston rods (2.8.3, 2.8.4) are connected by the cross member (2.1). The drive unit (2.8) comprises an electric motor with a spindle, and the spindle is connected to the cross member (2.1) by a threaded element. The cross member (2.1) has hammer head screws, forming fixing elements (2.3), which engage in corresponding slots or openings (1.6) of an end disk (1.2) or a similar element of the rotor (1), which through rotation by locking levers (2.6) engage behind the end disk (1.2) and are secured by nuts (2.7), wherein in this position the cross member (2.1) is in a rigid and releasable connection with the rotor (1). The pulling head (2.2) is connected to the slide (2.4) by a releasable element (2.5), such as an insertable interlocking element. The releasable element (2.5) can lock the pulling head (2.2) on the slide (2.4) in several spacings/positions and that the slide (2.4) has several suitable insertion positions therefor. When the piston rods (2.8.3, 2.8.4) are retracted, the slide (2.4) is arranged at a spacing in the axial direction of the rotor (1) which corresponds to the length of the respective hammer axle (1.5) plus tolerances, divided by the required or desired number of strokes for pulling the hammer axle (1.5), whereby the respective position assumed by the slide (2.4) is locked by the releasable element (2.5). The hammer axle (1.5), after having been completely pulled out, rests in the slide (2.4) and can optionally be exchanged against a new hammer axle (1.5), wherein its placement corresponds to the demounting and/or mounting position in the rotor (1) and the features recited in claims 6 to 12 are also applicable to the installation of the hammer axles (1.5).

Industrial Applicability

The invention has industrial applicability because demounting and remounting require only a small clearance, the peripheral devices can be installed closer to the more compact hammer crusher system, so that the function according to the invention facilitates repair and increases the availability of the system.

What is claimed is:

1. A method for demounting and remounting of at least one of a plurality of hammers (1.3), hammer axles (1.5) and protective caps (1.4) of a rotor (1) of a hammer crusher by utilizing a hammer axle pulling device (2), comprising the steps of:
   a) exposing the rotor (1), which remains mounted in at least part of the housing, and rotating and securing the rotor in an upper dead center position of the respective hammer axle (1.5);
   b) affixing a pulling head (2.2) on an exposed end of the hammer axle (1.5);
   c) positioning a cross member (2.1) with a plurality of first fixing elements (2.3) of the hammer axle pulling device (2) so that the first fixing elements (2.3) match corresponding second fixing elements (1.6) on a first face of the rotor (1);
   d) disengaging a releasable element (2.5) of a slide (2.4) of the hammer axle pulling device (2) so that the pulling head (2.2) may be displaced relative to the slide (2.4);
   e) producing a rigid and subsequently releasable connection between the first fixing elements (2.3) of the cross member (2.1) and the second fixing elements (1.6) of the rotor (1);
   f) advancing the slide (2.4) of the hammer axle pulling device (2) to a first position in which the pulling head (2.2) is affixed on the hammer axle (1.5) and locked to the slide (2.4) by engaging the releasable element (2.5);
   g) securing the position of at least one of the hammers (1.3) and the protective caps (1.4);
   h) retracting the slide (2.4) of the hammer axle pulling device (2) and simultaneously pulling the hammer axle (1.5) out to a second position in which at least one of the hammers (1.3) or the protective caps (1.4) can be removed freely;
   i) disengaging the releasable element (2.5) thereby releasing the connection between the pulling head (2.2) and the slide (2.4);
   j) advancing the slide (2.4) to a third position in which the pulling head (2.2) is again connected to the slide (2.4) with a positive fit;
   k) retracting the slide (2.4) and pulling the hammer axle (1.5) out to a fourth position in which at least one of all of the hammers (1.3), protective caps (1.4) and the hammer axles (1.5) are removed.

2. The method according to claim 1, wherein steps a) to k) are repeated according to the remaining number of hammer axles (1.5), hammers (1.3) and/or protective caps (1.4) to be exchanged in the rotor (1).

3. The method according to claim 1, wherein step a) further comprises releasing a locking element that secures the hammer axle (1.5) on the rotor (1).

4. The method according to claim 1, wherein step e) comprises rotating a locking lever (2.6) and the first fixing elements (2.3) of the cross member (2.1) so as to engage the first fixing elements behind the second fixing elements (1.6) of the rotor (1), whereby the cross member (2.1) is affixed to the rotor (1).

5. The method according to claim 1, wherein at least one of the hammer (1.3) and protective cap (1.4) are partially worn-out, further comprising the steps of:
   dismounting by rotating the at least one partially worn-out hammer (1.3) and the protective cap (1.4); and
   remounting by rotating in the opposite effective direction by 180° the at least one partially worn-out hammer (1.3) and the protective cap (1.4).

6. A device for demounting and remounting of at least one of a plurality of hammers, hammer axles and protective caps of a rotor of a hammer crusher, comprising:
   a drive unit (2.8) connected to a lockable slide (2.4), the drive unit (2.8) including a cross member (2.1) with first fixing elements (2.3) attachable to a rotor (1) of the hammer crusher, wherein the slide (2.4) and the cross member (2.1) are moveable together relative to the rotor (1) and the slide (2.4) is movable relative to the cross member (2.1); and
   a pulling head (2.2) releasably affixable to the hammer axle (1.5) and connectable to the slide (2.4) so as to be capable of assuming several relative positions thereto.

7. The device of claim 6, wherein the drive unit (2.8) comprises two hydraulic cylinders (2.8.1, 2.8.2) affixed to the slide (2.4), each hydraulic cylinder (2.8.1, 2.8.2) including a respective piston rod (2.8.3, 2.8.4), the piston rods (2.8.3, 2.8.4) being connected by the cross member (2.1).

8. The device of claim 6, wherein the drive unit (2.8) comprises an electric motor with a spindle, the spindle being connected to the cross number (2.1) by a threaded element.

9. The device according to claim 6, wherein the rotor (1) includes an end disk (1.2) and the first fixing elements (2.3) are hammer head screws that engage in corresponding openings (1.6) defined in the end disk (1.2), the device further including locking levers (2.6) engageable behind the end disk (1.2) and secured by nuts (2.7) so as to maintain a position of the cross member (2.1) relative to the rotor (1).

10. The device according to claim 6, wherein the pulling head (2.2) is connected to the slide (2.4) by a releasable element (2.5).

11. The device according to claim 10, wherein the releasable element (2.5) is adapted to lock the pulling head (2.2) on the slide (2.4) in several positions and wherein the slide (2.4) has several suitable insertion positions therefor.

12. The device of claim 7, wherein when the piston rods (2.8.3, 2.8.4) are retracted, the slide (2.4) is arranged at a spacing in an axial direction of the rotor (1) which corresponds to the length of the hammer axle (1.5) plus tolerances, divided by a required number of strokes for pulling the hammer axle (1.5) completely out from the rotor (1), the respective position assumed by the pulling head (2.2) relative to that of the slide (2.4) is locked by a releasable element (2.5).

13. The device according to claim 6, wherein the hammer axle (1.5), after having been completely pulled out from the rotor (1), rests in the slide (2.4) and is exchangeable against a new hammer axle (1.5), wherein its placement in the rotor (1) corresponds to the same position in the slide (2.4).

14. The method according to claim 1, further comprising the following remounting steps:

positioning a new hammer axle (1.5) an the slide (2.4);

advancing the slide (2.4) so as to connect with the pulling head (2.2);

release of the first fixing elements (2.3) of the cross member (2.1) of the slide (2.4) from the second fixing elements (1.6) of the rotor (1);

retracting the slide (2.4) so as to disengage the pulling head (2.2) relative to the hammer axle (1.5); and positioning the rotor (1) in a ready state for comminution processing.

15. The device according to claim 10, wherein the releasable element (2.5) is an insertable interlocking element.

* * * * *